(No Model.)
A. B. LIVINGSTON.
HAY RAKE AND LOADER.
No. 449,483. Patented Mar. 31, 1891.
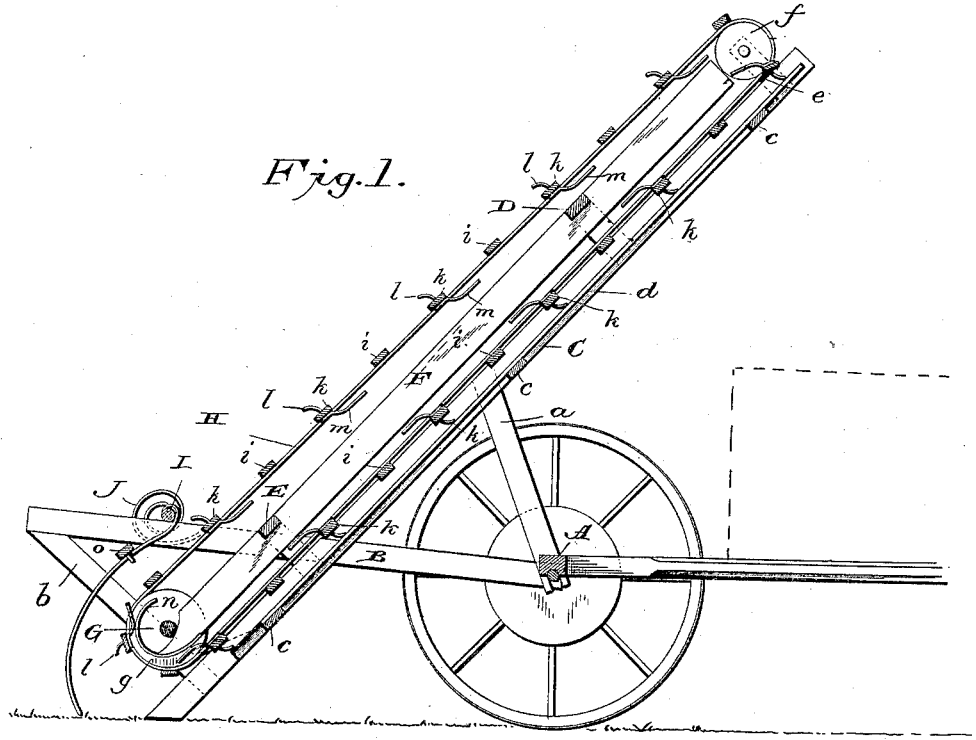
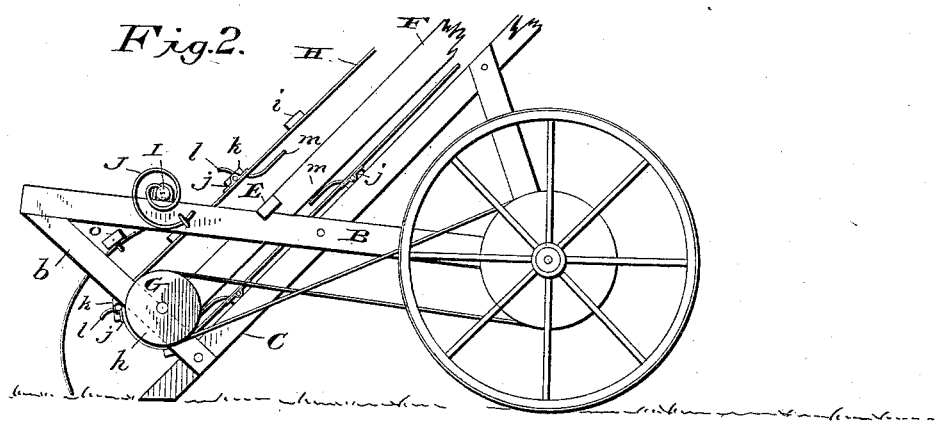
Alexander B. Livingston.
Inventor
Witnesses
by
Attorney

UNITED STATES PATENT OFFICE.

ALEXANDER B. LIVINGSTON, OF CLARK'S FORK, IDAHO.

HAY RAKE AND LOADER.

SPECIFICATION forming part of Letters Patent No. 449,483, dated March 31, 1891.

Application filed May 8, 1890. Serial No. 351,037. (No model.)

*To all whom it may concern:*

Be it known that I, ALEXANDER B. LIVINGSTON, a citizen of the United States of America, residing at Clark's Fork, in the county of Kcotenai and Territory of Idaho, have invented certain new and useful Improvements in Hay Rakes and Loaders; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to hay rakes and loaders; and it consists in the improved construction hereinafter described and set forth, whereby the toothed slats of the endless belt are always maintained in proper position and guided in their travel around the frame, and yet will have a limited yielding movement to prevent their binding during their movement.

In the accompanying drawings, forming part of this specification, Figure 1 is a vertical central section of a loader embodying my improvements, and Fig. 2 is a side view of the lower portion of the loader.

The main frame of the loader consists of the main transverse axle A, having the spindles for the carrying-wheels, rearwardly-extending horizontal bars B, upwardly and forwardly extended inclined bars C, and intermediate braces *a b*. Transverse strips *c* are secured to the under side of the bars C, and have secured thereto a series of longitudinal strips *d*, forming a guard to protect the endless-carrier teeth on the under side of the same. A transverse bar D connects the inclined side bars together, while a similar bar E connects the lower side braces. A central inclined bar F is connected to the bars D and E and forms a central guide, as hereinafter explained. Brackets *e e* at the upper ends of the inclined side bars carry pulleys *f*, while similar pulleys *g* are located on a shaft G, bearing in the lower braces, and the projecting end of which carries a grooved band-pulley *h*, geared by means of a belt with a larger pulley on the main driving and carrying wheels.

Around the pulleys *g* and *f* pass belts H, which are connected together by means of rods *i*, and opposite the ends of these rods the belts H are provided with bearing-blocks *j*, in which bear loosely the reduced ends of transverse slats *k*, each carrying a series of outwardly-projecting curved teeth *l*. The under side of each slat *k* is provided centrally with a bent leaf-spring *m*, extending in an opposite direction from the curved carrying-teeth, and the spring end portions of these leaves are designed to travel in contact with the under side of the central guide-bar F, so that the endless carrier with its slats will travel positively around the frame. The upper end of the guide-bar F is perfectly square, while the lower end carries an upwardly-curved spring *n*, secured on the under side of said bar. As the springs *m* move upward along the under side of the guide-bar and reach the upper end of the same they are so acted on by said end that the teeth on the slat are thrown out of the material, and when said springs reach the lower curved spring of the guide-bar they move regularly around the same and are again adjusted to properly co-operate with the guide-bar.

A transverse shaft I, supported on the horizontal side bars near the rear ends thereof, carries a series of rake-teeth braced together by a bar *o*, and the projecting ends of which are adapted to have secured thereto the free end portion of a spiral spring J, the other end of which is secured to the adjacent portion of the horizontal bar of the frame. Thus when the rake-shaft is subjected to torsional strain the rake-teeth will automatically yield and resume their normal position.

In operation the hay is collected or gathered by the rake-teeth, so as to collect it beneath the pulleys *g g* and in the path of the endless belts H H, which carry the cross-bars *k* and *i*. As the hay is gathered it is caught by the teeth *l* and elevated, the way which is being raised is carried upward above the slat C, and the carrying-teeth are held in an inclined position by the spring-leaves which bear against the under side of the central bar F. When the spring-leaves *m* pass the end of the bar F, the bars carrying the teeth are free to rock, and the hay is immediately released and falls into a wagon-box or receptacle. In this way the weight of the hay is at no time upon the elevating-belt and is confined, so that while being raised it is not liable to be blown away or shaken off the carrier.

I claim—

1. The combination, in a hay-loader, of an inclined supporting-frame, a slatted platform C carried thereby, transverse shafts at the upper and lower ends of the frame having pulleys, endless belts connected to each other by transverse slats, carrying-teeth attached to said slats, a central bar F, having a curved lower end, spring-plates carried by the transverse slats so as to abut against the under side of the bar F, and rake or gathering teeth in rear of the endless carrier, substantially as set forth.

2. The combination, in a hay rake and loader, of a supporting-frame constructed substantially as shown, and provided with a central bar F, having an upwardly-curved portion at its lower end, an inclined platform C beneath said guide-bars, transverse shafts located at the upper and lower ends of the frame, said shafts carrying a series of pulleys, an endless carrier made up of a series of belts and transverse slats, said slats carrying curved elevating-teeth $l$ and on the under side spring-plates $m$, which extend in an opposite direction from the elevating-teeth, spring rake-teeth located rear of the endless carrier, and a driving-belt, substantially as shown, and for the purpose set forth.

In testimony whereof I affix my signature in presence of two witnesses.

ALEXANDER B. LIVINGSTON.

Witnesses:
   H. M. CASEY,
   A. B. RAILTON.